Jan. 27, 1953 L. N. LAUER 2,626,684
BRAKE
Filed July 5, 1945 4 Sheets-Sheet 1
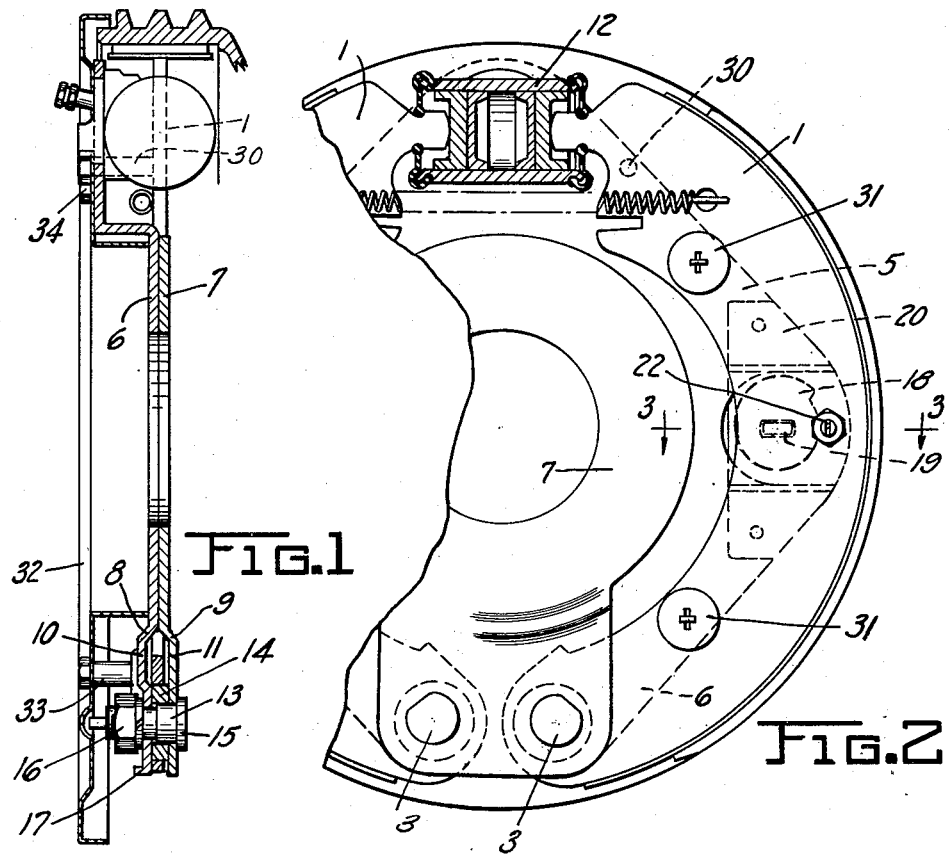
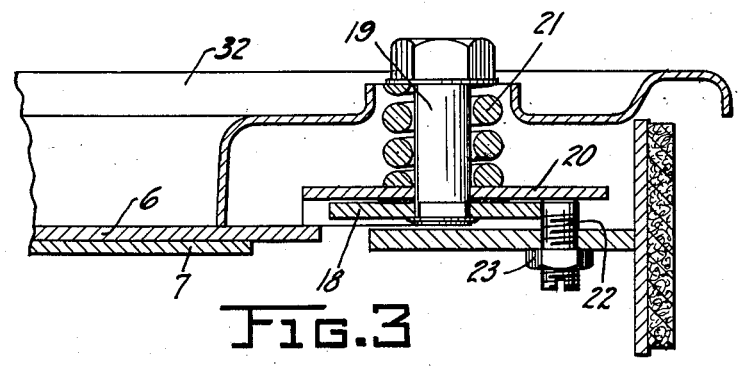
INVENTOR.
LEON N. LAUER
BY
T. J. Plante
ATTORNEY

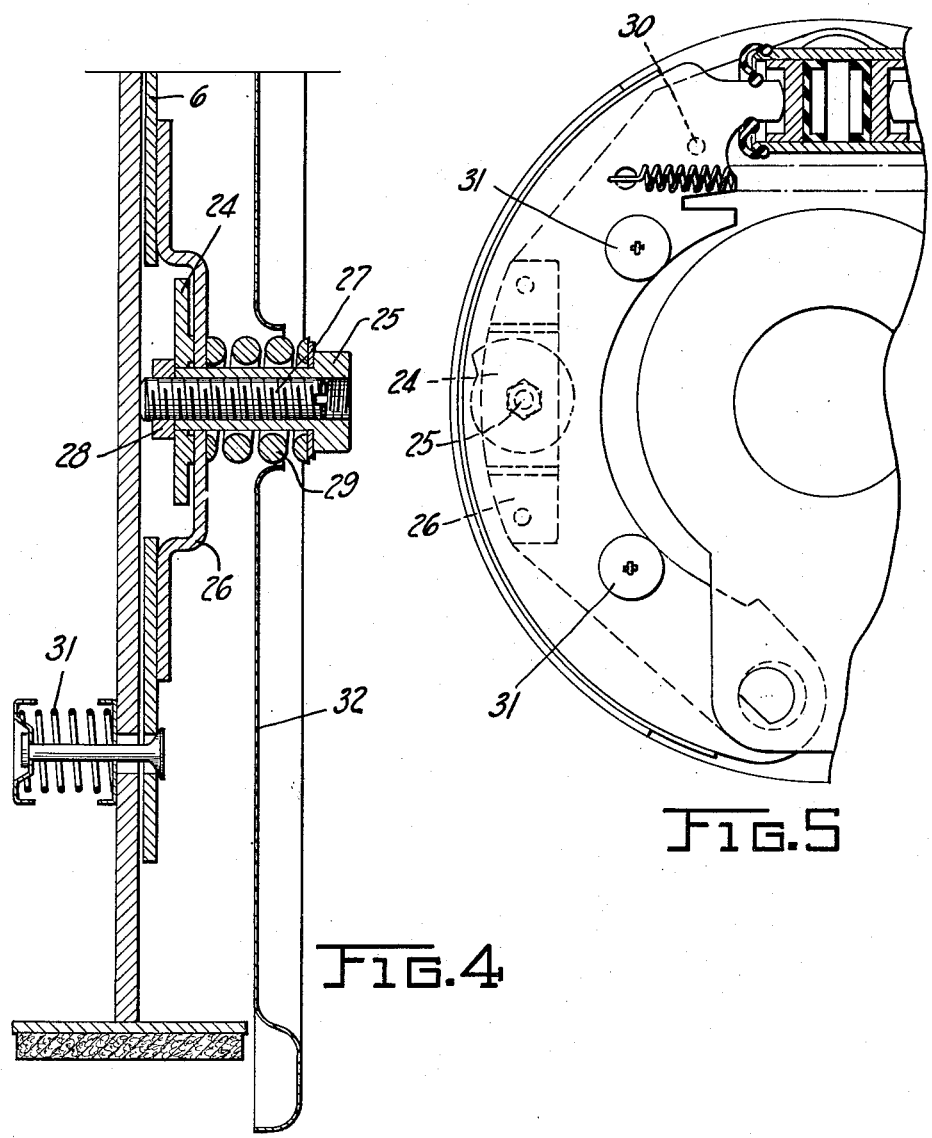

Jan. 27, 1953 L. N. LAUER 2,626,684
BRAKE
Filed July 5, 1945 4 Sheets-Sheet 3

INVENTOR.
LEON N. LAUER
BY
T. J. Plante
ATTORNEY

Jan. 27, 1953     L. N. LAUER     2,626,684
BRAKE

Filed July 5, 1945                                                        4 Sheets-Sheet 4

INVENTOR.
LEON N. LAUER
BY
*T.J.Plante*
ATTORNEY

Patented Jan. 27, 1953

2,626,684

UNITED STATES PATENT OFFICE 2,626,684

BRAKE

Léon Nicolas Lauer, Clichy, France, assignor to Bendix Aviation Corporation, New York, N. Y.

Application July 5, 1945, Serial No. 603,391
In France January 14, 1943

Section 1, Public Law 690, August 8, 1946
Patent expires January 14, 1963

19 Claims. (Cl. 188—78)

The invention relates to brakes and more particularly to internal expanding brakes.

Heretofore the fixed brake support such as the conventional backing plate, on which were mounted the anchor pins, supporting the brake shoes individually suspended thereon, or absorbing the braking torque from the whole shoe assembly, was located at a substantial distance from the median plane of these shoes so that these pins presented an overhang which increased with the width of the brake shoe rim. As a result thereof, under the action of the stresses, often very important, generated in case of intensive braking, the said anchor pins caused in the vicinity of their anchoring points considerable torsional stresses, which moreover changed their direction depending on whether the braking was effected in forward or rearward motion. To eliminate any shifting or change of position of the anchor pins under the action of these stresses, which may result in irregularities of the operation of the brake, the necessity has arisen to use strong backing plates of substantial thickness requiring considerable expense in metal. The present invention aims to overcome this drawback by an arrangement suppressing the distortion of the brake elements under the action of the stresses generated in operation.

One object of the invention is to replace the conventional backing plate by a brake support, the median plane of which registers with the median plane of the brake shoes. In the case of brake shoes with a single web, the plane of the brake support will register with the plane of the web, and the anchor pins are carried by the brake support at their ends on either side of the web. In case the braking power to be generated is very important, as it is the case for heavy duty vehicles, wherein brake shoes with two webs are used, the brake support is located between the two webs and supports the anchor pins at the middle part thereof, whereby the brake shoe webs are hinged or abut on the anchor pin on either side of this support. This symmetric arrangement of the brake support and of the anchor pins provides good rigidity to the system, eliminating any twisting of the support, thus enabling to be realized an important reduction of weight and economy of metal since it makes possible the use of sheet iron of dimensions less than required by the conventional backing plates.

Another object of the invention is to provide a sham backing plate acting as dust cover adapted to fit on the brake support which plate can be made of light iron sheet since it is not subjected to stress.

A further object of the invention is to provide a device for taking up the wear of the lining as well as for adjusting the lateral position of the brake shoes.

Still another object of the invention is to provide an improved brake shoe with two webs formed by two single web brake shoes having their rims connected one to the other such as by welding.

Other objects of the invention will appear from the following description taken in connection with the drawings which form part of the specification, and in which:

Figure 1 is a vertical sectional view of a brake illustrating the application of the invention to an embodiment with two single web brake shoes respectively pivoted on two anchor pins;

Figure 2 is a semi-elevation of this brake;

Figure 3 is a larger scale section at 3—3 of Fig. 2 showing an embodiment of a device for taking up the wear of the lining and adjusting the lateral position of the brake shoes;

Figure 4 is an enlarged scale section of another embodiment of a device for taking up the wear of the lining as well as for adjusting the lateral position of the brake shoes;

Figure 5 is a semi-elevation of a brake similar to that shown in Figures 1 and 2 illustrating the arrangement of the adjusting device shown on Figure 4 and a somewhat different brake support;

Figure 6:
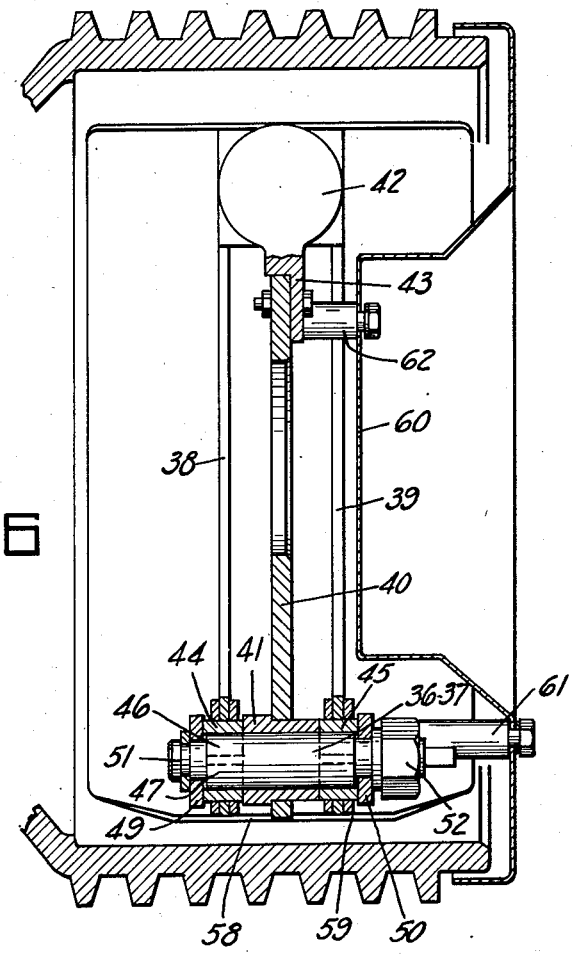
Figure 6 is a vertical section of a brake with two webs pivoted on an anchor pin carried at the middle thereof by a brake support.

The brake shown in Figures 1 and 2 comprises brake shoes 1 pivoted on anchor pins 3 carried by the brake support replacing the conventional backing plate and indicated generally in 5. This brake support is designed in such a manner that the median plane thereof registers with the median plane of the brake shoes viz with the brake shoe web. As illustrated in the drawings, the brake support 5 is formed by two iron sheets 6 and 7 assembled one to the other such as by welding, riveting or in any other manner, and provided with a central hole, through which extends the wheel axle, and with holes on the periphery in which are located the anchor pins 3. The two iron sheets 6 and 7 are formed adjacent the anchor pins 3 with two opposite offsets 8 and 9 cooperating one with the other to form a fork into which project the ends of the shoe webs which are hinged on the anchor pins 3 carried at their respective ends by the fork members 10 and 11 located at each side of the common median plane of said brake shoes as well as of the support 5. The iron sheet 7 which is of substantially circular shape is smaller than the iron sheet 6 and serves to reinforce the latter at the central part thereof. The circular contour of the iron sheet 7 clears the brake shoe webs, while the iron sheet 6 is elongated in shape and extends substantially up to the brake shoe webs as illustrated on Figure 2. The iron sheet 6 is designed to carry the brake applying means generally indicated in 12 and is associated with means for taking up the wear and adjusting the lateral position of the shoes as will be described more fully hereinafter. In the embodiment shown in the drawings, the brake applying means is of the hydraulic type, but it is understood that it can be of any other type.

The anchor pins 3 are of conventional type and comprise a stem 13 extending into opposed openings provided in the fork arms 10 and 11. Between said fork arms the pins are formed with two flats (not shown) on which is mounted an eccentric ring 14, whereby upon rotating the respective anchor pin, the position of the brake shoe can be adjusted to take up the differences occurring in manufacture. Each anchor pin is provided at one end with a head 15 and at the other end with a threaded portion on which is screwed a nut 16 to lock the pin in position, the eccentric ring 14 and the fork arms being pressed one against the other and held rigidly between the head 15 and the nut 16.

The front surface of the fork arm 10 is provided with a dished part 17, or any other means such as washer, to secure a lateral stop for the brake shoes on the support preventing the brake shoe from running out of true position. The two other lateral positioning means of the brake shoes provide one fulcrum point adjacent to the brake applying means and another at the middle of the brake shoe. According to a novel feature of the invention, the latter fulcrum point can be provided by a combined lateral positioning and wear adjusting means, two embodiments of which are shown on Figures 3 and 4.

As shown in Figure 3, this device includes an eccentric 18 for taking up the wear of the linings. This eccentric is secured to a pin 19 carried by an offset section 20 of the iron sheet 6 or by a member secured thereto. A spring 21 mounted on the pin 19 is inserted between the head of the latter and the outer surface of the offset section 20 thus keeping the eccentric 18 in engagement with the inner surface of this section. The eccentric 18 cooperates with the brake shoe through the intermediary of a screw 22, carried by the web of said brake shoe. The end of this screw contacts with the inner surface of the offset section 20 and acts as an abutment insuring the lateral position of the brake shoe. The screw 22 is adjustable to maintain the brake shoe in true lateral position and is locked by a lock nut 23 for that purpose. As to the adjustment of the wear of the linings, it is realized by rotating by means of the pin 19 the eccentric 18 which, by acting upon the screw 22, advances the brake shoe towards the drum.

The means for combined adjustment of the wear of the linings and of the lateral position of the brake shoes shown on Figure 4 comprises as well as the preceding structure an eccentric 24 secured on a hollow pin 25 which is mounted on a stamping 26 secured to the iron sheet 6. The stamping bestrides a port provided in the sheet 6 and forms a recess for the eccentric 24. The hollow pin 25 is in threaded connection with a pin 27 extending therethrough and butting against the web of the brake shoe. The pin 27 is locked in position by a lock nut 28, and a spring 29 is inserted onto the hollow pin 25 between the head thereof and the stamping 26 to apply the eccentric against the inner surface of the latter. In this embodiment, the eccentric acts directly onto the rim or flange of the brake shoe and the adjustment of the lateral position of the shoe is realized by rotating the pin 27 by means of a screw-driver inserted through the head of the hollow pin 25.

By conventional springs 31, each of the brake shoes is kept applied against three lateral rest stops formed by the projection on the fork arm 10, by the combined lateral positioning and wear adjusting means and by the conventional stop 30.

In order to keep the brake assembly as described above free from dust, there is provided a sham backing plate 32, acting as a dust cover. This sham plate is formed as an annular cover secured to the brake support 5 and is for instance kept in place by means of posts 33 and of pins 34. The manner of construction and of attachment of the cover enables its easy removal and a quick inspection of the brake, without having to dismount the wheel or the drum or even to jack the vehicle. The function of the cover being only to keep the latter free of dust, it can be made of light sheet iron, thus insuring a protection of the brake at minimum expense of metal.

Figure 7:
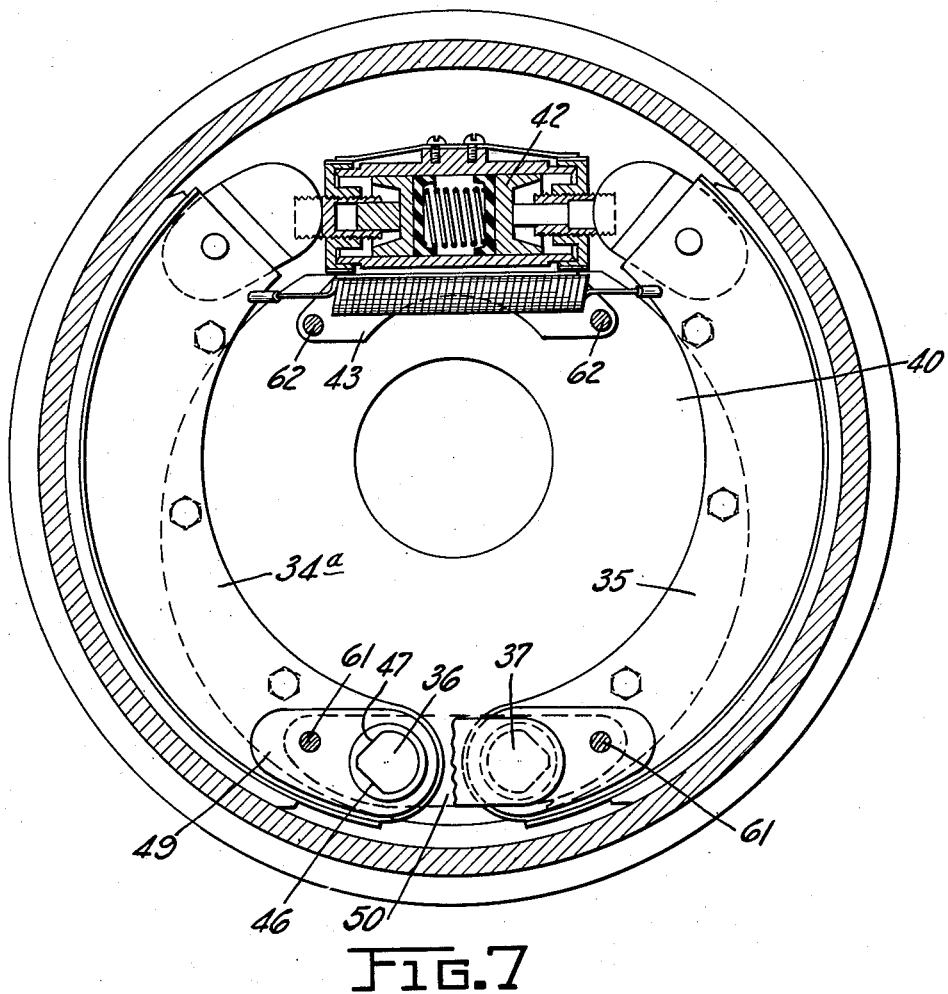
Figure 7 is an elevation of the brake shown on Figure 6.

Figures 6 and 7 show a brake in which the shoes 34a, 35 mounted on anchor pins 36, 37 have double webs 38 and 39 (Fig. 6). Anchor pins 36, 37 are supported intermediate their ends by the brake support 40 which replaces the conventional backing plate. Support 40 is formed by an iron sheet located in the median plane of the brake shoes and provided with a central opening for the wheel axle and with holes on the periphery for mounting of the anchor pins. Anchor pins 36 and 37 are mounted on the brake support 40 through the intermediary of a sleeve 41 secured to said support, such as by welding. The brake applying means 42 which in the embodiment shown on the drawing is constituted by a hydraulically operated wheel cylinder, but which can be of any other type, is secured to the upper part of the brake support by means of lugs 43. These lugs form an integral part of the cylinder and may extend at one side or at both sides of the brake support.

The two webs 38, 39 of each of the shoes are mounted on eccentric rings 44 and 45 located at each end of the sleeve 41 on corresponding sections of the pin each section of which is formed with two flats 46 and 47. Thus by rotating the pins 36, 37, it is possible to adjust the position of the brake shoes to compensate the differences of manufacture. The anchor pins 36, 37 are reinforced at their ends by plates 49 and 50 which bear on one of their sides against the eccentric rings 44 and 45, the assembly of parts being locked in position between the heads 51 and the nuts 52 of the two anchor pins.

In this embodiment, the lateral positioning means of the brake shoes are formed by devices of a novel type including a pin 53 screwed in the brake support 40. The head of this pin acts as a stop for one of the webs 38 of the brake shoe enabling adjustment of the distance between this web and the brake support by rotating the pin 53. The pin may be immobilized afterwards by a lock nut 54. In order to take up manufacturing clearances and eliminate vibrations, the length of the pin 53 is less than the distance between the webs and a spring 55 mounted on said pin is interposed between the lock nut 54 and a cup 56 adapted to bear against the second web 39 of the brake shoe.

Figure 8:
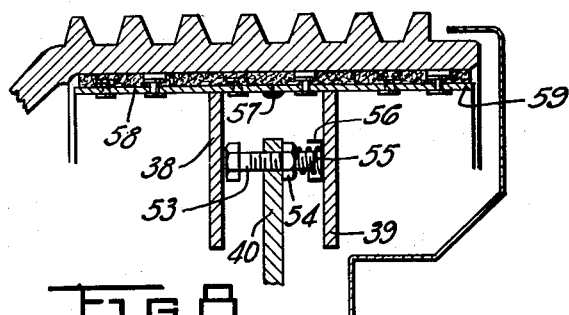
Figure 8 is a view on an enlarged scale showing the structure of a two-web brake shoe and of a lateral positioning means adapted to cooperate with such brake shoes.

According to another feature of the invention, two web brake shoes can be obtained as shown in 57 on the Figure 8 by welding rims 58 and 59 of two single web shoes along their entire periphery.

As in the case of single web brake shoes described above, a sham backing plate acting as dust cover 60 is provided to close the brake elements within the drum and prevent the entry of dust. This cover is made of light sheet iron and is fixed on post 61 carried by the cross member 50 reinforcing the anchor pins and on post 62 carried by the attachment lug 43 of the hydraulic wheel cylinder.

There has thus been provided a brake of more rigid construction which permits realization of economy in and better utilization of the metal.

Although this invention has been described in connection with certain specific embodiments, the principles involved are susceptible of numerous other applications and may be attained in diverse manners that will readily occur to persons skilled in the art. For instance, the brake support instead of being formed by two sheets connected one to the other as described with reference to Figures 1, 2 and 4 or by a single sheet as described with reference to Figures 6, 7 and 8, may likewise be formed, without departing from the spirit of the invention, by a casting. Such a casting furnishes a symmetrical mounting and equilibrium of the anchor pins and eliminates any twisting of the brake support.

What I claim is:

1. A brake comprising a drum, a friction means, a fixed support located in the median plane of the friction means, a sleeve secured to the support, and an anchor pin cooperating with the friction means and located in the sleeve.

2. A brake comprising a drum, a T-section brake shoe consisting of a rim and web, a fixed support formed by two metal sheets connected one to the other centrally thereof, one of said metal sheets having a circular contour of radius which lies within the inner edge of said web, the other metal sheet extending alongside of said web and within the inner surface of said rim, lateral shoe guiding means carried by said other sheet, spaced portions on the metal sheets, an anchor pin carried by the spaced portions and cooperating with the brake shoe to transmit thereto in operation the braking torque, the median plane of the support registering with the median plane of the brake shoe.

3. A brake comprising a drum, two brake shoes, a web forming part of each shoe, a fixed support formed by two metal sheets connected one to the other centrally thereof, one of said metal sheets having a circular contour dimensioned so as to clear the brake shoes, the other metal sheet dimensioned so as to extend along side of the brake shoe webs, lateral shoe guiding means carried by said other sheet, spaced portions on the metal sheets, two anchor pins carried by the spaced portions and each pivotally supporting a brake shoe, the median plane of the support registering with the median plane of the brake shoe.

4. A brake support comprising two metal sheets connected one to the other centrally thereof, one of said sheets having a circular contour and the other having portions extending beyond said circular contour, lateral guiding means for a brake shoe carried by said other sheet, spaced portions on the metal sheets forming a fork like member and an anchor pin carried by the fork like member.

5. A brake support comprising two metal panels connected one to the other centrally thereof, one of said metal panels extending beyond the other, and adjustable anchor carried by both of said panels, a brake applying means carried by the extending metal panel and lateral guiding means for a brake shoe carried by said extending panel.

6. A brake comprising a drum, friction means, a fixed support the median plane of which registers with the median plane of the friction means, eccentric annular anchorage means, means carried by the support for adjusting the anchorage means, and shoe positioning means comprising a bifurcated shoe web receiving portion of said fixed support.

7. A brake comprising a non-rotatable torque-reaction member consisting of a flat annular stamping, a hydraulic actuator constituted by a casting having a body portion located radially outwardly beyond the periphery of the torque-reaction member, the body portion of said casting having a cylinder bore formed therein on an axis lying in the plane of the torque-reaction member said casting having a single integral laterally-offset radially inwardly extending flat flange lying against one face of the torque-reaction member, and a plurality of axially extending fastening members extending through openings provided in the torque-reaction member and in the flange of the casting to secure said flange to the torque-reaction member.

8. A brake comprising a substantially flat non-rotatable torque-reaction member, a hydraulic cylinder having a body portion located radially outwardly beyond the periphery of the torque-reaction member, the body portion of said cylinder having a bore formed therein on an axis lying in the plane of the torque-reaction member, said cylinder having a single integral laterally-offset radially inwardly extending flat flange lying against one face of the torque-reaction member, and a plurality of axially extending fastening members extending through openings provided in the torque-reaction member and in the flange of the cylinder to secure said flange to the torque-reaction member.

9. A brake comprising a non rotatable torque-reaction member, and an actuator having a body portion located radially outwardly beyond the periphery of the torque-reaction member and having a radially inwardly extending flange lying against the torque-reaction member and secured thereto.

10. A drum brake structure comprising a supporting spider having a planar central portion and adapted to be secured to a fixed member, and a casting provided with hydraulic shoe-actuating means and having a substantially flat mounting portion normal to the planar central portion of the spider, the center of said mounting portion being in the plane of the central portion of the spider.

11. A brake comprising a non-rotatable support member constituted by a pair of plates centrally fastened together, a pair of T-section brake shoes carried on said support member with the webs of said shoes lying in the plane of said support member, one of said plates being substantially circular in shape with a radial projection extending beyond the periphery thereof, the circular section of said one plate clearing said shoes, the other of said plates being larger than the first and extending alongside the webs of said shoes, lateral shoe guiding means carried by said larger plate, said plates being spaced apart at the location of the said radial projection, and a pair of eccentric anchor pins rotatably mounted in the spaced portions of said plates, one end of each shoe being pivoted on a corresponding pivot pin.

12. A brake comprising a non-rotatable support member constituted by a pair of plates centrally fastened together, a pair of T-section brake shoes carried on said support member with the webs of said shoes lying in the plane of said support member, one of said plates being substantially circular in shape with a radial projection extending beyond the periphery thereof, the circular section of said one plate clearing said shoes, the other of said plates being larger than the first and extending alongside the webs of said shoes, lateral shoe guiding means carried by said larger plate, said plates being spaced apart at the location of the said radial projection, a pair of eccentric anchor pins rotatably mounted in the spaced portions of said plates, one end of each shoe being pivoted on a corresponding pivot pin, and an actuator mounted on the larger of said plates between the other ends of the two shoes in a position whereby the actuator thrust is exerted in the plane of said support member.

13. A brake comprising a non-rotatable support member constituted by a pair of plates centrally fastened together, a pair of T-section brake shoes carried on said support member with the webs of said shoes lying in the plane of said support member, one of said plates being substantially circular in shape with a radial projection extending beyond the periphery thereof, the circular section of said one plate clearing said shoes, the other of said plates being larger than the first and extending alongside the webs of said shoes, lateral shoe guiding means carried by said larger plate, lining adjustment means carried on said larger plate, said plates being spaced apart at the location of the said radial projection, and a pair of eccentric anchor pins rotatably mounted in the spaced portions of said plates, one end of each shoe being pivoted on a corresponding pivot pin.

14. A brake comprising a drum, a support member having a flat central portion adapted to be secured to a rigid stationary member, a bifurcated portion formed on said support member and disposed radially outwardly from said central portion, one furcation of said bifurcated portion being provided with a shoe-guiding abutment, an anchor pin supported near each of its ends by said bifurcated portion, the mid-length section of said anchor pin lying in the plane of said central portion, and a brake shoe having a web which has one end pivotally received by the mid-length section of said anchor pin and which lies in the median plane of said central portion, one side of said web normally engaging said shoe-guiding abutment.

15. A brake comprising a drum, a support member having a flat central portion adapted to be secured to a rigid stationary member, a bifurcated portion formed on said support member and disposed radially outwardly from said central portion to provide a shoe guiding abutment surface, an anchor pin supported near each of its ends by said bifurcated portion, the mid-length section of said anchor pin lying in the plane of said central portion, an annular element secured to said mid-length section having an outer periphery eccentric with the axis of said pin, and a brake shoe having a web which has one end pivotally received on the outer periphery of said element and which lies in the median plane of said central portion, rotation of said pin causing said element to rotate and shift the corresponding end of said shoe eccentrically with respect to said pin.

16. A brake comprising a non-rotatable torque-reaction member, a brake shoe supported on said torque-reaction member, said shoe comprising a rim and two spaced reinforcing webs, said torque-reaction member located in the median plane of said shoe, a sleeve secured to said torque-reaction member, and an anchor pin cooperatively associated with said shoe and being positioned in said sleeve.

17. A brake comprising a non-rotatable torque-reaction member, a brake shoe supported on said torque-reaction member, said shoe comprising a rim and two spaced reinforcing webs, said torque-reaction member located in the median plane of said shoe, actuator means carried by said torque-reaction member and arranged to actuate said shoe for applying the brake, a sleeve secured to said torque-reaction member, and an anchor pin cooperatively associated with said shoe and being positioned in said sleeve.

18. A brake comprising a non-rotatable torque-reaction member, a brake shoe supported on said torque-reaction member, said shoe comprising a rim and two spaced reinforcing webs, said torque-reaction member located in the median plane of said shoe, a member secured to said torque-reaction member, and an anchor element operatively engaged by the webs of said shoe and arranged to transfer the braking torque of said shoe through said member to said torque-reaction member.

19. A brake comprising a non-rotatable torque-reaction member, a brake shoe supported on said torque-reaction member, said shoe comprising a rim and two spaced reinforcing webs, said torque-reaction member located in the median plane of said shoe, a sleeve secured to said torque-reaction member, an anchor pin positioned in said sleeve, and two eccentric annular members received on opposite ends of said pin, each of said annular members being engaged by a corresponding web whereby the anchor load of said shoe will pass through said annular members, said anchor pin, and said sleeve into said torque-reaction member.

LÉON NICOLAS LAUER.

REFERENCES CITED

The following references are of record in the file of this patent:

UNITED STATES PATENTS

| Number | Name | Date |
|---|---|---|
| 1,789,448 | Parker et al. | Jan. 20, 1931 |
| 1,957,635 | Evans | May 8, 1934 |
| 1,974,176 | Dick | Sept. 18, 1934 |
| 2,064,616 | La Brie | Dec. 15, 1936 |
| 2,102,852 | La Brie | Dec. 21, 1937 |
| 2,214,911 | Shinn | Sept. 17, 1940 |
| 2,214,967 | Loweke | Sept. 17, 1940 |
| 2,215,567 | Schnell | Sept. 24, 1940 |
| 2,245,740 | White | June 17, 1941 |
| 2,248,171 | Hatch | July 8, 1941 |
| 2,296,673 | Hunyady | Sept. 22, 1942 |
| 2,322,121 | Frank | June 15, 1943 |
| 2,347,599 | Forbes | Apr. 25, 1944 |
| 2,365,715 | Mattersdorf | Dec. 26, 1944 |
| 2,381,737 | Goepfrich | Aug. 7, 1945 |
| 2,406,754 | Forbes | Sept. 3, 1946 |